(12) United States Patent
Maruya

(10) Patent No.: US 7,283,658 B2
(45) Date of Patent: Oct. 16, 2007

(54) TOPOGRAPHIC MEASUREMENT USING STEREOSCOPIC PICTURE FRAMES

(75) Inventor: Makoto Maruya, Kanagawa (JP)

(73) Assignee: EC Toshiba Space Systems, Ltd. (JP)

( * ) Notice: Subject to any disclaimer, the term of this patent is extended or adjusted under 35 U.S.C. 154(b) by 777 days.

(21) Appl. No.: 10/600,087

(22) Filed: Jun. 20, 2003

(65) Prior Publication Data

US 2004/0005091 A1 Jan. 8, 2004

(30) Foreign Application Priority Data

Jun. 20, 2002 (JP) ............................ P2002-180064

(51) Int. Cl.
*G06K 9/00* (2006.01)
(52) U.S. Cl. .................. 382/144; 382/154; 348/42; 348/144; 345/427
(58) Field of Classification Search ................ 382/144, 382/154; 348/144, 42, 169, 143, 145; 370/465, 370/538, 385; 351/57, 158; 124/87; 345/440, 345/427, 428
See application file for complete search history.

(56) References Cited

U.S. PATENT DOCUMENTS

| | | | | |
|---|---|---|---|---|
| 4,951,136 A | * | 8/1990 | Drescher et al. ............ | 348/145 |
| 5,168,531 A | * | 12/1992 | Sigel ........................... | 382/291 |
| 5,596,494 A | * | 1/1997 | Kuo .............................. | 702/2 |
| 5,606,627 A | * | 2/1997 | Kuo ............................. | 382/154 |
| 5,764,231 A | * | 6/1998 | Ray et al. .................... | 345/419 |

FOREIGN PATENT DOCUMENTS

| | | |
|---|---|---|
| JP | A 8-180206 | 7/1996 |
| JP | A 10-197244 | 7/1998 |
| JP | A 11-278400 | 10/1998 |
| JP | P2002-63580 | 2/2002 |

OTHER PUBLICATIONS

Applicant's summarization in English of Japanese patent Nos. 8-180206; 10-197244; 11-278400 and P2002-63580.

* cited by examiner

*Primary Examiner*—Sheela Chawan
(74) *Attorney, Agent, or Firm*—Ostrolenk, Faber, Gerb & Soffen, LLP

(57) ABSTRACT

Disclosed is a topographic measurement system wherein at least one satellite is used to scan the earth surface and send picture frames of a target area captured at different positions to an earth station. The picture frames are combined to produce a number of pairs of frames which constitute a stereoscopic image of the target area. Each frame pair is analyzed according to a number of visual characteristics and evaluated with a set of fitness values representative of the degrees of fitness of the frame pair to topographic measurement of the target area. A total of the fitness values is obtained from each frame pair and compared with the total values of other frame pairs. A frame pair having the highest total value is selected as a best pair. A parallax between the best pair frames is determined to produce first and second sets of line-of-sight vectors for conversion to topographic data.

39 Claims, 10 Drawing Sheets

FRAME 1

FRAME 2

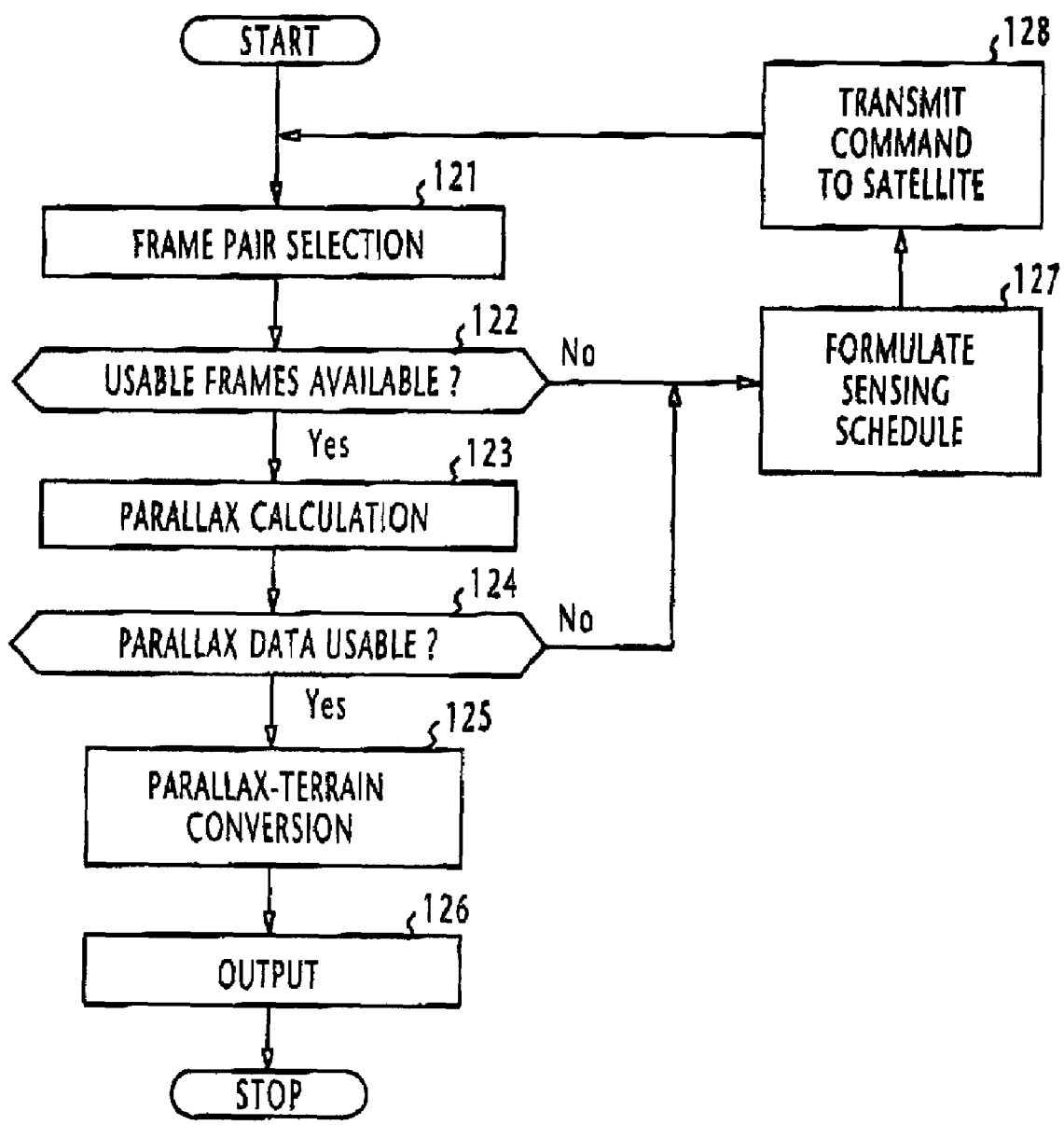

TOPOGRAPHIC MEASUREMENT USING STEREOSCOPIC PICTURE FRAMES

BACKGROUND OF THE INVENTION

1. Field of the Invention

The present invention relates generally to topographic measurement of a target area using image sensors mounted on flying vehicles such as earth observation satellites.

2. Description of the Related Art

Topographic measurement using stereoscopic pictures is known as remote sensing technology. In one topographic measurement system known as a cross-track stereoscopic imaging system, a single image sensor (HRV and AVNIR sensors) mounted on a satellite (SPOT and ADEOS satellites) is used to capture a number of pictures of a target area at different times when the satellite is encircling on separate orbits. In other system known as an along-track imaging system, use is made of two image sensors (OPS and PRISM sensors) on board a single satellite (JERS-1 and ALOS satellites) to capture multiple pictures of a target area at different angles when the satellite is encircling on the same orbit over the target area. While the latter is able to send pictures at frequent intervals, hence available stereoscopic pictures can be easily obtained, a high-capacity memory is required on board the ship to store pictures before transmission to the earth. However, in applications where a high resolution of one meter is desired, the cross-track stereoscopic imaging has been preferred to the along-track stereoscopic imaging.

A recent advance in the remote sensing technology is the development of an earth observation satellite such as IKONOS and Quick Bird satellites in which a single sensor performs the functions of both cross-track imaging and along-track imaging systems.

When a pair of stereoscopic pictures is sensed, the pictures are scanned line by line and transmitted from the satellite in the form of frames to the earth station. The transmitted frames are analyzed in terms of point-to-point correlations between the frames to determine how much they differ from one another. This correlation information is known as parallax. Using a model of the image sensor, a position is determined in a three-dimensional coordinate system for each point-to-point correlation. A set of such 3-D position data obtained from a target area constitutes topographic data of the target area, However, in order to sense a target area from an earth observation satellite, it is necessary to ensure that, when the satellite is approaching the target area, it is bright under sun light and not shadowed by any cloud. Chances for taking appropriate pictures are therefore limited. In particular, in applications where high resolution is desired, a single-sensor, cross-track earth observation satellite will be used. When the satellite is approaching a target area, the sensor must be pointed toward the target area from different angles at different times to obtain a pair of stereoscopic frames. Therefore, the target area must be clear and bright for both chances of image sensing. Additionally, the target area must be pointed from relatively large angles. This requires that the satellite orbits be distanced sufficiently from each other. During the time the satellite is encircling on intermediate orbits, no appropriate pictures cannot be taken, which leads to a low efficiency of satellite utilization. Therefore, target areas suitable for acquiring stereoscopic pictures are significantly limited.

SUMMARY OF THE INVENTION

It is therefore an object of the present invention to provide a topographic data processor and a topographic measurement system which can acquire stereoscopic picture frames with high efficiency of satellite utilization.

The stated object is obtained by the provision of a frame pair selector for selecting a pair of picture frames that constitute a stereoscopic image from multiple frames which may be stored in a storage medium or received from one or more satellites.

According to a first aspect of the present invention, there is provided a topographic data processor comprising means for selecting a pair of frames from a plurality of candidate frames of a target area captured from different high-altitude positions, the pair of frames constituting a stereoscopic image of the target area, means for determining a parallax between the selected frames and producing therefrom a first plurality of line-of-sight vectors and a second plurality of line-of-sight vectors, and means for converting the first and second pluralities of line-of-sight vectors to topographic data.

A best frame pair is selected by first forming candidate picture frames into a plurality of pairs of stereoscopic frames and then evaluating the frame pairs with fitness values representative of their fitness to topographic measurement and selecting a best frame pair having the highest fitness value.

According to a second aspect, the present invention provides a topographic data processor comprising frame selecting means for selecting a pair of frames from a plurality of candidate frames of a target area captured from high-altitude positions, the selected pair of frames constituting a stereoscopic image of the target area. Scheduling means is provided for selecting at least one airborne image sensor if an appropriate frame is not available in the plurality of candidate frames and sensing picture frames from the selected image sensor, whereby the frame selecting means uses the sensed frames to select a pair of frames. A parallax calculation means is provided for determining a parallax between the frames selected by the frame selecting means and producing therefrom a first plurality of line-of-sight vectors and a second plurality of line-of-sight vectors. The first and second pluralities of line-of-sight vectors are converted to topographic data.

According to a third aspect of the present invention, there is provided a topographic measurement system comprising at least one image sensor mounted on a vehicle flying over a target area, a receiver for receiving a plurality of picture frames captured by the image sensor at different positions, means for selecting a pair of frames from the plurality of frames, the pair of frames constituting a stereoscopic image of the target area, means for determining a parallax between the selected frames and producing therefrom a first plurality of line-of-sight vectors and a second plurality of line-of-sight vectors, and means for converting the first and second pluralities of line-of-sight vectors to topographic data.

According to a fourth aspect of the present invention, there is provided a topographic measurement system comprising at least one image sensor mounted on a vehicle flying over a target area, a receiver for receiving a plurality of picture frames captured by the image sensor at different positions, frame selecting means for selecting a pair of frames from the plurality of frames of the target area, the selected pair of frames constituting a stereoscopic image of the target area, scheduling means for selecting at least one image sensor if an appropriate frame is not available in the plurality of frames, sensing picture frames from the selected image sensor, whereby the frame selecting means uses the sensed frames to select a pair of frames, means for determining a parallax between the frames selected by the frame selecting means and producing therefrom a first plurality of line-of-sight vectors and a second plurality of line-of-sight vectors, and means for converting the first and second pluralities of line-of-sight vectors to topographic data.

BRIEF DESCRIPTION OF THE DRAWINGS

The present invention will be described in detail further with reference to the following drawings, in which:

FIG. 12 is a flowchart useful for describing the operation of the second embodiment of the present invention.

DETAILED DESCRIPTION

Figure 1:
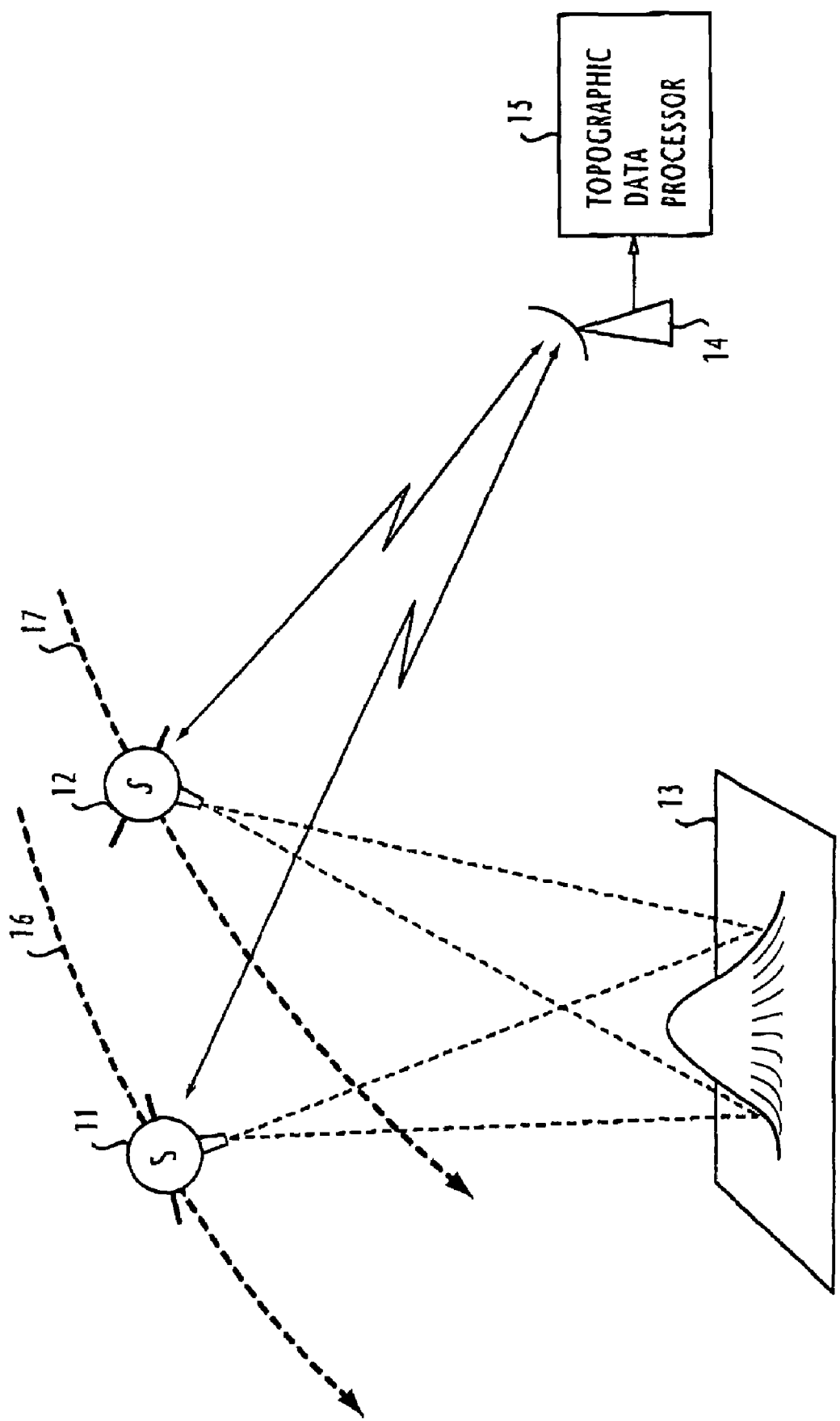
FIG. 1 is a schematic diagram of a land observation system according to a first embodiment of the present invention.
Figure 2:
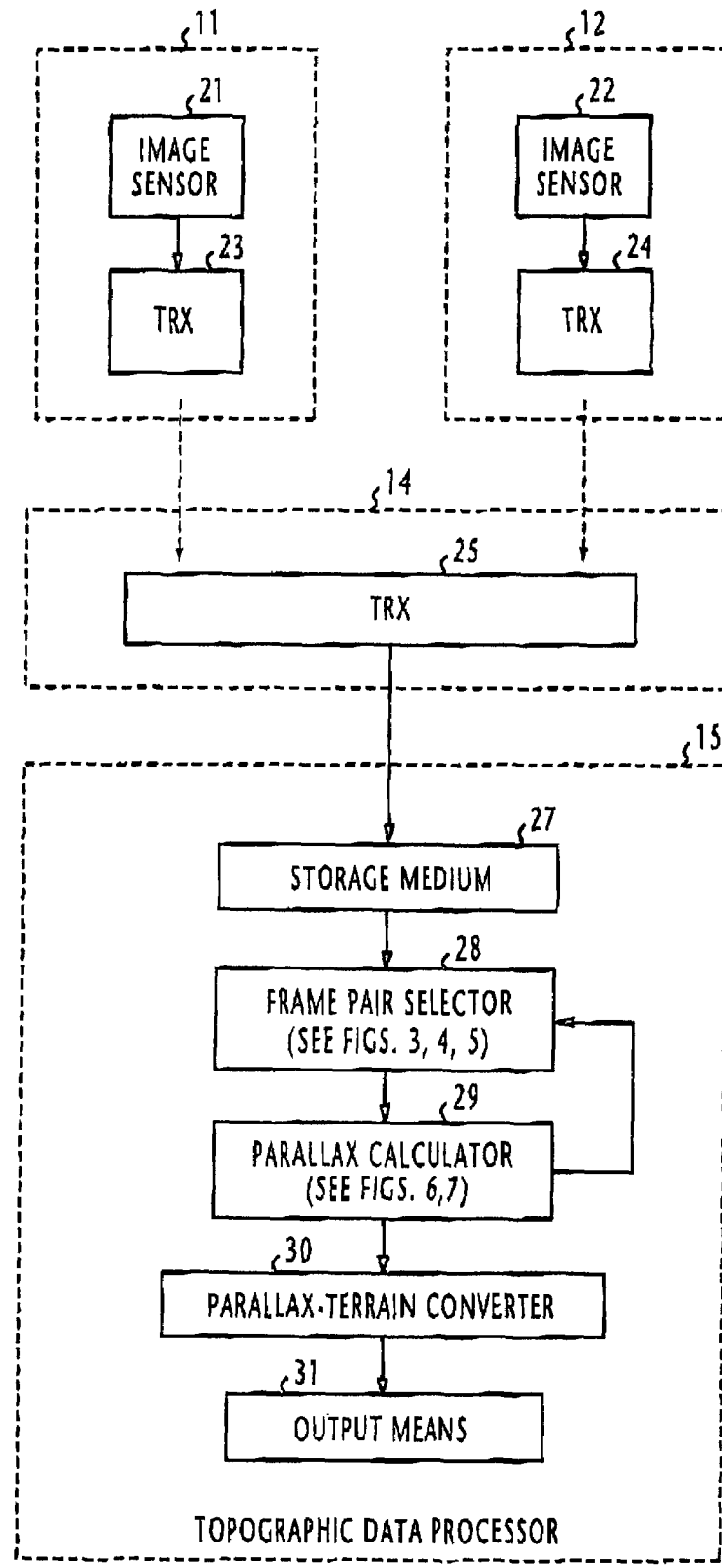
FIG. 2 is a block diagram of a topographic data processor of the first embodiment of the present invention.

Referring now to FIGS. 1 and 2, there is shown a land observation system according to a first embodiment of the present invention. The system includes a first land observation satellite 11 encircling the earth on an orbit 16 and a second land observation satellite 12 encircling the earth on an orbit 17 spaced from the orbit 16. Each satellite is constantly capturing images of the land surface including a target area 13. Specifically, the satellite 11 includes a two-dimensional CCD sensor 21 and a high-precision telescope, not shown, for focusing the image of a land surface onto the CCD sensor 21 and an RF transmitter 23. Likewise, the satellite 12 includes a two-dimensional CCD sensor 22 and a high-precision telescope, not shown, for focusing the image of a land surface onto the CCD sensor 22 and an RF transmitter 24.

The images (picture frames) captured by both satellites are transmitted on a downlink frequency from the transmitters 23 and 24 to an earth station 14 where the RF signals are amplified and down-converted to baseband signals by an RF transceiver 25. The signals received from both satellites are stored in a storage medium 27 which may be provided in a topographic data processor 15. In this way, the storage medium 27 stores a series of picture frames of land surfaces captured by satellites 11 and 12.

As will be described in detail later, a pair of picture frames which form a stereoscopic image adequate for the determination of the altitude of a surface feature of a target area is selected by a frame pair selector 28 from the storage medium 27. The selected pair of picture frames are supplied to a parallax calculator 29 to detect a parallax between the selected frames. Based on the calculated parallax, the parallax calculator 29 produces a first plurality of line-of-sight vectors from one of the selected frames and a second plurality of line-of-sight vectors from the other frame. A parallax-terrain converter 30 is connected to the output of the parallax calculator 29 to produce topographic data based on the first plurality of line-of-sight vectors and the second plurality of line-of-sight vectors. The topographic data is supplied to output means 31.

Figure 3:
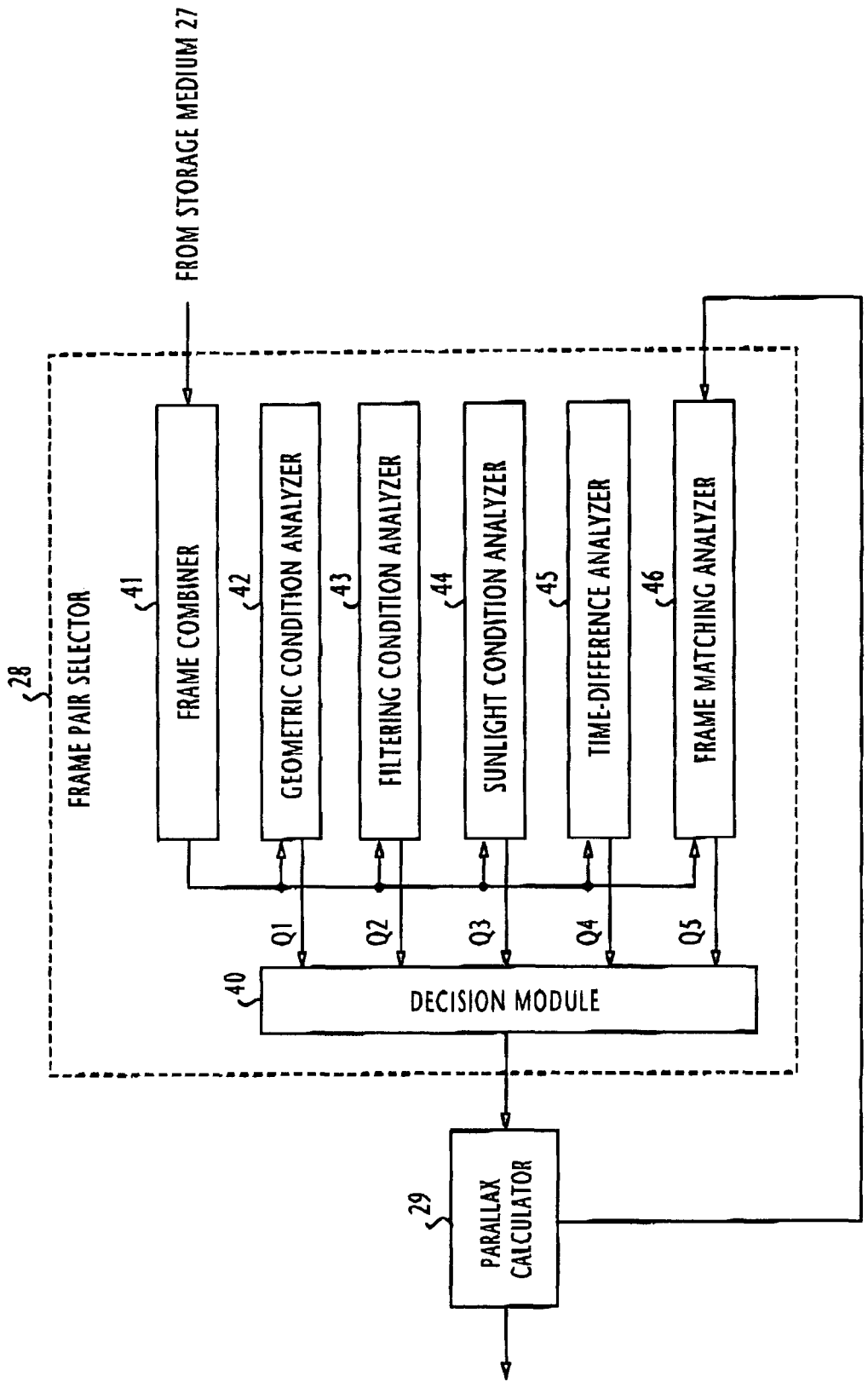
FIG. 3 is a block diagram of the frame pair selector of the topographic data processor.

As illustrated in detail in FIG. 3, the frame pair selector 28 comprises a decision module 40, a frame combiner 41 and a plurality of analyzers 42 to 46.

Since the picture frames captured by the satellites may contain images which cover outside of the target area 13, the frame combiner 41 first selects only those picture frames covering the target area and proceeds to combine picture frames selected from those captured by satellite 11 with frames selected from those captured by satellite 12 to form a plurality of frame pairs each composing a stereoscopic image of the target area. If a frame consists of red, green, blue and near-infrared light components, these components are not treated individually in so far as their resolutions are equal to each other. Since panchromatic images have in most cases twice as high resolution as red, green and blue components, they are treated separately from the color components. All pairs of frames combined by the frame combiner 41 are supplied to all analyzers 42 to 46 as candidate frame pairs.

Analyzers 42 to 46 perform individual analysis on the candidate frame pairs according to different visual characteristics and evaluate each pair of frames with a set of fitness values Q1 through Q6 each being representative of the fitness of the frame pair to topographic measurement of the target area.

For each frame pair, the decision module 40 scales the fitness values with respective weight values $w_i$ and totals the weighted fitness values $w_i Q_i$ to produce a quality value Q of the frame pair. The process is repeated on all frame pairs and finally the decision module 40 selects one of the frame pairs having the highest quality value as a best frame pair.

Analyzer 42 is a geometric condition analyzer which evaluates the candidate frame pairs and determines a weight value Q1 according to geometric conditions of the frame of each pair, such as the resolution (i.e., an area covered by a single pixel and measured in terms of meters) or the angles of orientation of the satellites to the land surface. In a simple yet effective method, a pair of high-resolution frames is evaluated with a high weight value.

If the frames of a pair are of different resolution, the frame of lower resolution is chosen to evaluate the pair. The evaluation of a pair with lower resolution is preferred to evaluating the pair with an average value of the resolutions of its frames. In this case, the fitness value Q1 is given as:

$$Q1 = 1/\text{Resolution} \qquad (1)$$

If high precision is important for the frame pair evaluation, quantum errors of the frames of each pair are used to evaluate the pair. In principle, this method involves determining a displacement in a three-dimensional space between the frames of a stereoscopic pair on a pixel-by-pixel basis and representing it a quantum error in a system of three-dimensional axes.

Figure 4:
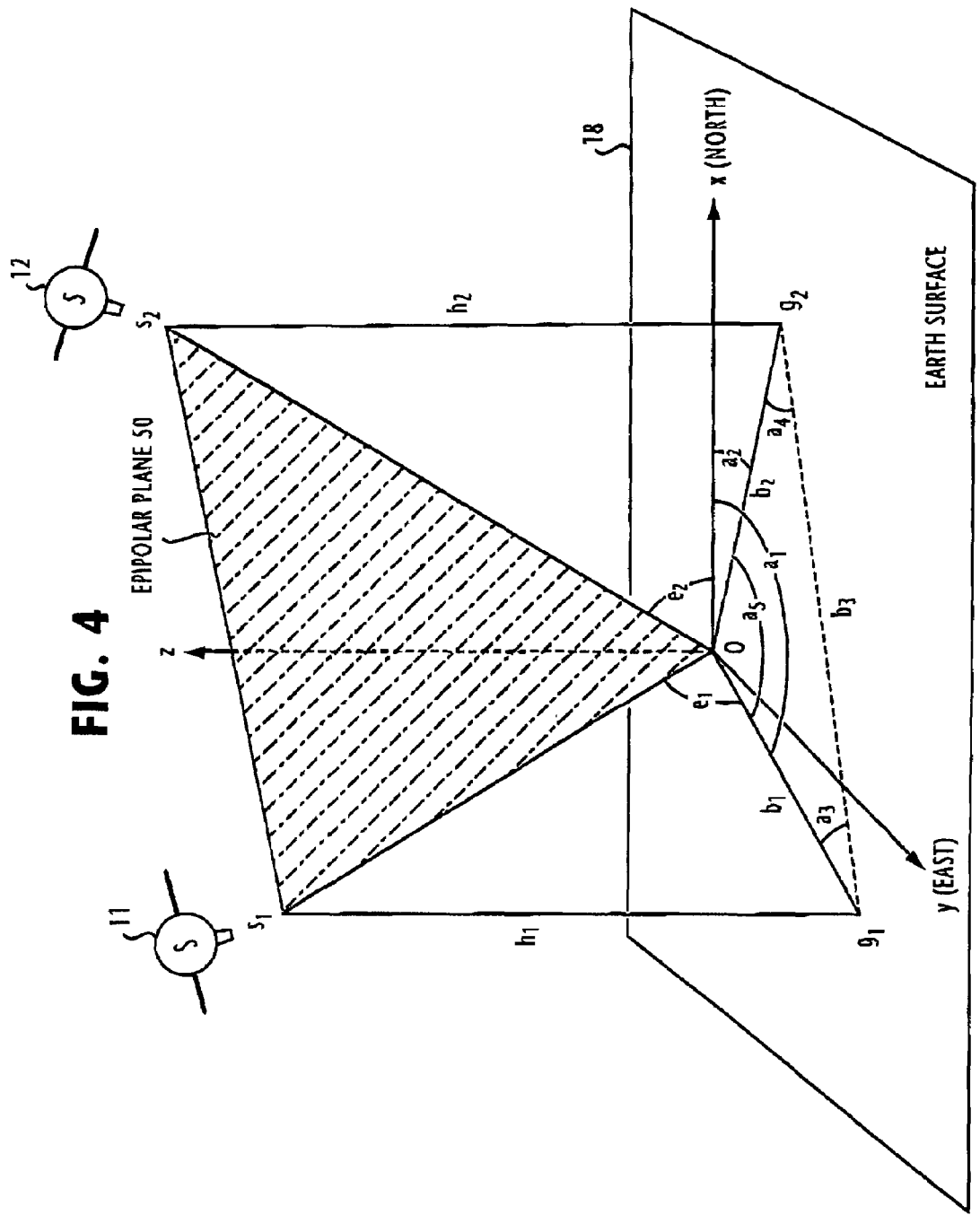
FIGS. 4 and 5 are schematic diagrams useful for describing the operation of the geometric condition analyzer of the topographic data processor.

Assume that the image sensors of satellites 11 and 12 are pointing toward a target point "o" in a three-dimensional coordinate system (x, y, z) with its x and y axes pointing North and East, respectively, on the earth surface 18 (which is approximated as a flat plane), and its z axis pointing skyward, as shown in FIG. 4. The image sensor of satellite 11 is located in a position $s_1$ of altitude $h_1$ from the ground point $g_1$, azimuth angle $a_1$ and angle of elevation $e_1$, while the image sensor of satellite 12 is located in a position $s_2$ of altitude $h_2$ from the ground point $g_2$, azimuth angle $a_2$ and angle of elevation $e_2$. Ground points $g_1$ and $g_2$ are at distances $b_1$ and $b_2$ from the point of origin o, respectively, and mutually spaced at distance $b_3$. Points o, $g_1$ and $g_2$ form a triangle with inner angles $a_3$, $a_4$ and $a_5$, and points o, $s_1$ and $s_2$ form a triangle, called epipolar plane 50. A portion of the epipolar plane 50 in the neighborhood of the point of origin "o" can be enlarged as shown in FIG. 5 to illustrate its details to the size of pixels.

Figure 5:
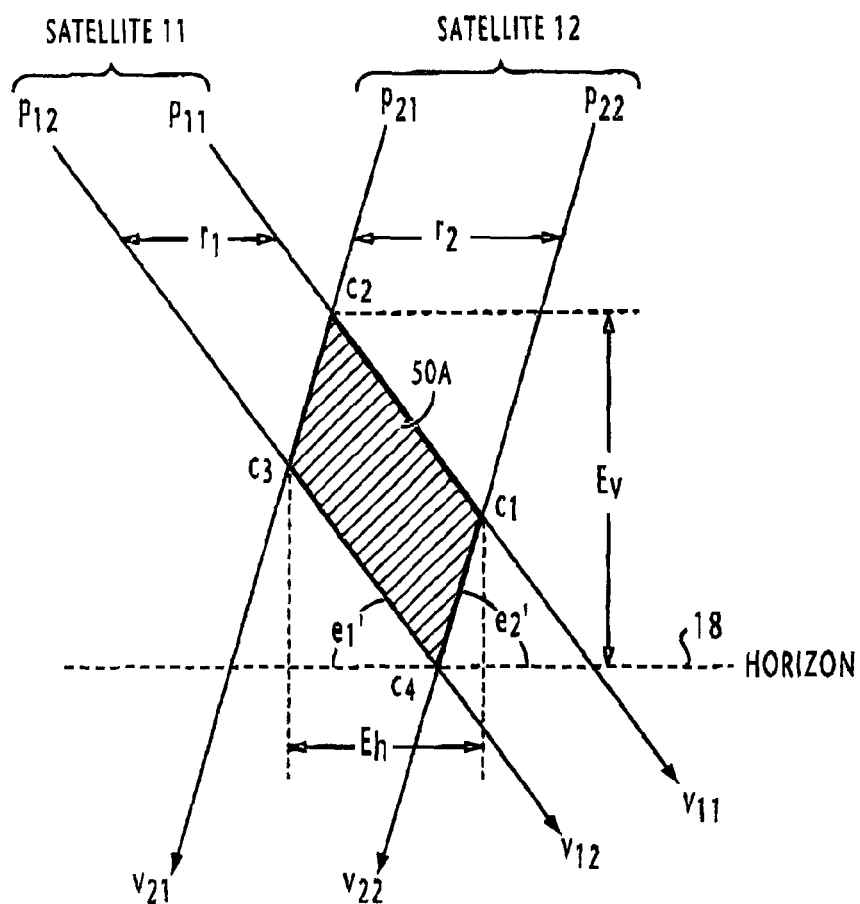

In FIG. 5, adjacent pixels on the image sensor of satellite 11 are indicated as $p_{11}$ and $p_{12}$ from which line-of-sight vectors $v_{11}$ and $v_{12}$ extend toward the point of origin. Likewise, adjacent pixels on the image sensor of satellite 12 are indicated as $p_{21}$ and $p_{22}$ from which line-of-sight vectors $v_{21}$ and $v_{22}$ extend toward the point of origin. Horizontal distance $r_1$ between line-of-sight vectors $v_{11}$ and $v_{12}$ represents the resolution of the image sensor of satellite 11 and horizontal distance $r_2$ between line-of-sight vectors $v_{21}$ and $v_{22}$ represents the resolution of the image sensor of satellite 12.

On the epipolar plane 50, the line-of-sight vector $v_{12}$ forms an angle $e_1'$ to the earth surface 18 and the line-of-sight vector $v_{22}$ forms an angle $e_2'$ to the earth surface 18. The angles $e_1'$, $e_2'$ and the resolutions $r_1$, $r_2$ are given as follows:

$$e_1' = \arctan\{h_1/b_1 \cos a_3\} \tag{2a}$$

$$e_2' = \arctan\{h_2/b_2 \cos a_4\} \tag{2b}$$

$$r_1 = r_1' \sin e_1' \tag{3a}$$

$$r_2 = r_2' \sin e_2' \tag{3b}$$

where $r_1'$ and $r_2'$ are the resolutions of the sensors of satellites 11 and 12 when they directly point to ground points $g_1$ and $g_2$, respectively.

The quantum error at the point of origin "o" is represented by an area 50A defined by line segments $c_1$-$c_2$, $c_2$-$c_3$, $c_3$-$c_4$ and $c_4$-$c_1$. Therefore, a stereoscopic image whose area 50A is small is evaluated with a high fitness value since the size of the area 50A determines the resolution of the image. The quantum error is decomposed into a horizontal component $E_h$ and a vertical component $E_v$ which are given as follows:

$$E_h = (r_1' \tan e_1' + r_2' \tan e_2')/(\tan e_1' + \tan e_2') \tag{4a}$$

$$E_v = (r_1' + r_2')(\tan e_1')(\tan e_2')/(\tan e_1' + \tan e_2') \tag{4b}$$

It is seen that the fitness value Q1 of a frame pair is inversely proportional to its quantum error as given by the following relations:

$$Q1 = 1 \text{ (if } E_h < E_{h\_\text{req}} \text{ and } E_v < E_{v\_\text{req}}\text{)} = 0 \text{ (otherwise)} \tag{5}$$

where $E_{h\_\text{req}}$ and $E_{v\_\text{req}}$ are threshold values of $E_h$ and $E_v$.

Alternatively, the fitness value Q1 can be determined as:

$$Q1 = q\_1/E_h + 1/E_v \tag{6}$$

where q_1 represents a parameter of positive value for giving different weights to the error components $E_h$ and $E_v$. In most cases, the parameter q_1 is equal to unity. In comparison with other analyzers, the geometric condition analyzer 42 plays a significant role for selecting a best frame pair from the candidate frame pairs.

Analyzer 43 is a filtering condition analyzer which evaluates the frame pairs from the frame combiner 41 in terms of their weight to topographic measurement which varies depending on the filtering characteristics of the satellite image sensors. Picture frames obtained by a satellite image sensor with the full spectrum of visible light, i.e., panchromatic images, are usually of high S/N quality and fitting to topographic measurement. If two frames are obtained by image sensors of like filtering characteristics, they are also suitable to form a pair for topographic measurement since they are less affected by differences in filtering characteristics when a parallax is calculated between them. Therefore, the filtering condition analyzer 43 evaluates the frames of each candidate pair with a fitness value Q2 which is proportional to the amount of visible spectral components they have obtained as a result of the filtering characteristics of the satellite sensors as well as to the likeness of their wavelength characteristics to each other. The fitness value Q2 is expressed by the following formula:

$$Q2 = \frac{\int_S f(w)g(w)\,dw}{S} \tag{7}$$

where, S indicates the spectrum of visible light, w is the wavelength, and f(w) and g(w) represent the filtering characteristics of the image sensors of satellites 11 and 12, respectively (i.e., the transmissibility of filtered visible wavelengths incident on the image sensors). The functions f(w) and g(w) are of high value if the transmissibility of wavelengths is high. Equation (7) thus indicates that greater the filtering functions overlap each other the fitness value Q2 becomes higher. The panchromatic image is given the highest Q2 value.

Analyzer 44 is a sunlight condition analyzer which evaluates the frames of each candidate pair with a fitness value Q3 in terms of their weight to the calculation of parallax which varies depending on the sunlight condition under which the frames are captured. If sunlight conditions under which frames of a pair are captured are substantially equal to each other, their images will show similar shadow and shading effects to each other. Since the frames of like sunlight conditions result in an accurate parallax, they are evaluated with high fitness value Q3.

The following is an evaluation formula for the fitness value Q3:

$$Q3 = 1 \text{ (if } |a_1 - a_2| < d \text{ and } |e_1 - e_2| < d\text{)} = 0 \text{ (otherwise)} \tag{8}$$

where, d is a threshold angle of several degrees. Equation (8) indicates that Q3 is high if azimuth angles $a_1$ and $a_2$ and angles of elevation $e_1$ and $e_2$ are almost equal to each other. If their differences exceed the threshold angle, the influence of sunlight conditions on frames remains constant.

Analyzer 44 is a time-difference analyzer which evaluates the frame pairs from the frame combiner 41 in terms of their weight to topographic measurement which varies depending on the time difference between the frames of each pair. Since the time difference between frames (two or three seconds, for example) may result in objects pictured in one frame taking different shapes and positions from those of the other, a high fitness value Q4 is given to a pair of frames whose time difference is small. However, the time difference may vary significantly depending on the orbits of satellites and other factors.

Q4 is given as follows:

$$Q4 = \exp(-T_d) \tag{9}$$

where $T_d$ is the absolute value of difference between the pictured timings of the frames and represented by the number of days. The fitness value Q4 may also be given by observing frame pictures by human eyes. If the pictures of any two frames differ substantially, a low value of Q4 is manually given to these frames.

Analyzer 46 is a frame matching analyzer that evaluates each pair of combined frames with a fitness value Q5 in terms of their degree of match between the combined frames. The degree of match between frames of each pair is determined by an average value of correlation values obtained by the parallax calculator 29 for each frame pair as follows:

$$Q5=AVs \qquad (10)$$

As will be described later, the parallax calculator 29 defines windows (the size of a few pixels) in corresponding positions of the frames of a pair and obtains correlation values between the windows. Frame matching analyzer 46 averages the correlation values (between −1 and 1) obtained by the parallax calculator 29. If the average value of correlations between frames of a pair is high, it is considered that there is a high degree of match between the frames and the frame pair is evaluated with a high fitness value Q5.

It is seen from the foregoing that, for each frame pair, a set of fitness values Q1~Q5 is obtained. The same process is repeated until a plurality of sets of fitness values Q1~Q5 are obtained from all frame pairs formed by the frame combiner 41.

Specifically, the decision module 40 calculates the following Equation by respectively weighting the fitness values of a frame pair to obtain a total value of weighted fitness value as a quality value Q of the frame pair:

$$Q = w_1 Q1 + w_2 Q2 + w_3 Q3 + w_4 Q4 + w_5 Q5 \qquad (11)$$

where, $w_1$ through $w_5$ are weight values for the analyzers 42 through 46. One example of the weight values is:

$$w_1 = 10 \text{ and } w_2 = w_3 = w_4 = w_5 = 1$$

If the frame pair selector 28 is provided with only one analyzer, i.e., the geometric condition analyzer 42, the weight value $w_1$ is set equal to unity and all other weight values are set equal to zero.

Decision module 40 repeats the same process on all frame pairs supplied from all analyzers to produce their quality values Q and selects one of the frame pair having the highest quality value.

Figure 6:
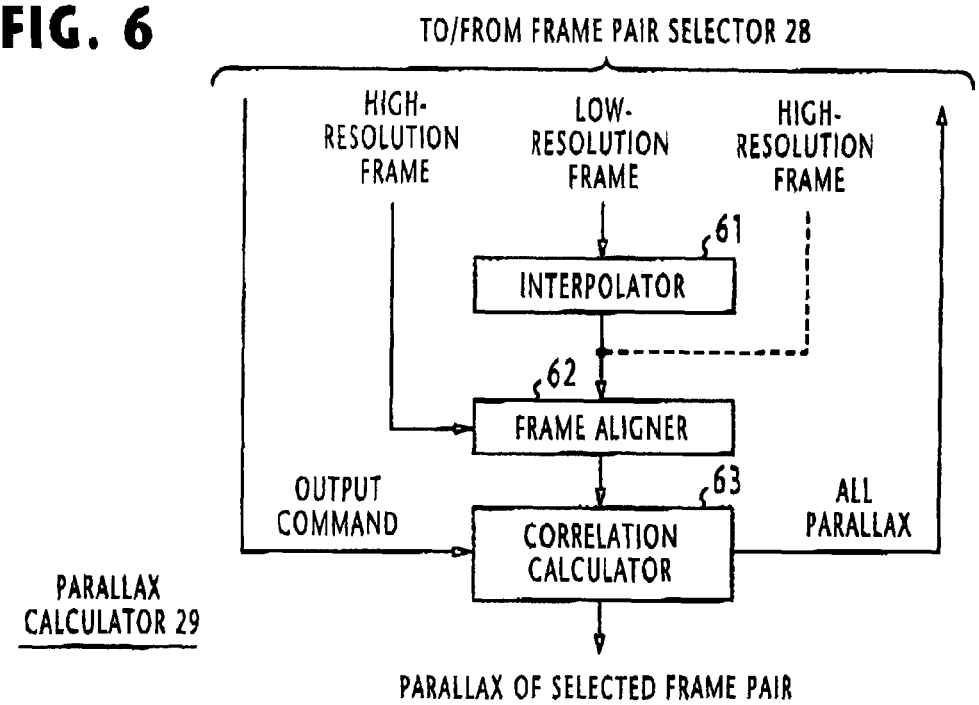
FIG. 6 is a block diagram of the parallax calculator of the topographic data processor.

As shown in FIG. 6, the parallax calculator 29, connected to the output of the frame pair selector 28, includes an interpolator 61, a frame aligner 62 and a correlation calculator 63. If frames of different resolutions are selected as a best pair by the frame pair selector 28, the frame of lower resolution is supplied to the interpolator 61 to improve its resolution so that it is equal to the resolution of the other frame. The frames are then supplied to the frame aligner 62, where the frames are aligned so that they are parallel with an epipolar line of a stereoscopic image. The aligned frames are fed into the correlation calculator 63.

Figure 7:
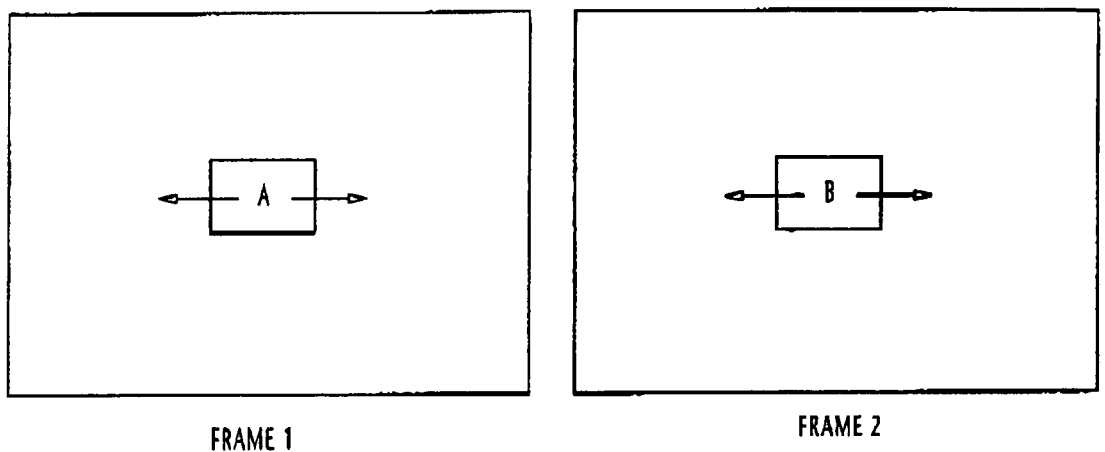
FIG. 7 is a schematic diagram useful for describing the operation of the parallax calculator.

As shown in FIG. 7, the correlation calculator 63 segments each of the aligned frames into rectangular windows of several pixels on each side and takes correlation between windows A and B of corresponding positions to determine a correlation value $r_{j,k}$ as follows:

$$r_{j,k} = \frac{\sum_j \sum_k \{(I(A, j, k) - M(A))(I(B, j, k) - M(B))\}}{\sqrt{\sum_j \sum_k \{I(A, j, k) - M(A)\}^2} \sqrt{\sum_j \sum_k \{I(B, j, k) - M(B)\}^2}} \qquad (12)$$

where, I(A, j, k) is the pixel value of point (j, k) of the window A, I(B, j, k) is the pixel value of point (j, k) of the window B, and M(A) is the average of pixel values of window A, and M(B) is the average of pixel values of window B.

By successively shifting the positions of the windows A and B pixel by pixel and calculating correlation values, the analyzer 46 seeks relative positions of windows A and B where there is a peak or maximum correlation value. When such positions are detected, the analyzer 46 produces output data indicating the corresponding relationship between the center pixel of window A and the center pixel of window B. The above process is repeated for all windows of the frames to obtain a plurality of frame-to-frame corresponding relationships (i.e., line-of-sight vectors) as parallax data.

On the other hand, the parallax data are obtained from all frame pairs supplied from the frame pair selector 28 are fed back to the frame matching analyzer 46. When this occurs, the decision module of the frame pair selector 28 receives all sets of weight data Q1 to Q5 from the analyzers 42 to 46 and selects a best frame pair and commands the correlation calculator 63 to supply the parallax data of the best frame pair to the parallax-terrain converter 30.

In more detail, as previously described with reference to FIG. 5, if pixels $p_{11}$ and $p_{22}$ correspond to each other, the intersection point $c_1$ of line-of-sight vectors $v_{11}$ and $v_{22}$ lies on a surface feature of the target area. In order to obtain a plurality of such intersection points in a three-dimensional coordinate system to produce topographic data, this conversion process is repeated for all line-of-sight vectors represented by the parallax data to describe all surface features of the target area.

Parallax-terrain converter 30 performs a parallax-terrain conversion process by using the line-of-sight vectors indicated by the parallax data of the selected frame pair to produce terrain data which represents surface features of the target area.

Topographic data is supplied from the parallax-terrain converter 30 to output means 31 such as display or memory.

Due to the provision of the frame pair selector 28, picture frames taken by any pair of multiple image sensors can be selected for producing topographic data, eliminating the inability to produce topographic data due to the absence of stereoscopic images and enabling the selection of best stereoscopic images for particular purposes.

Figure 8:
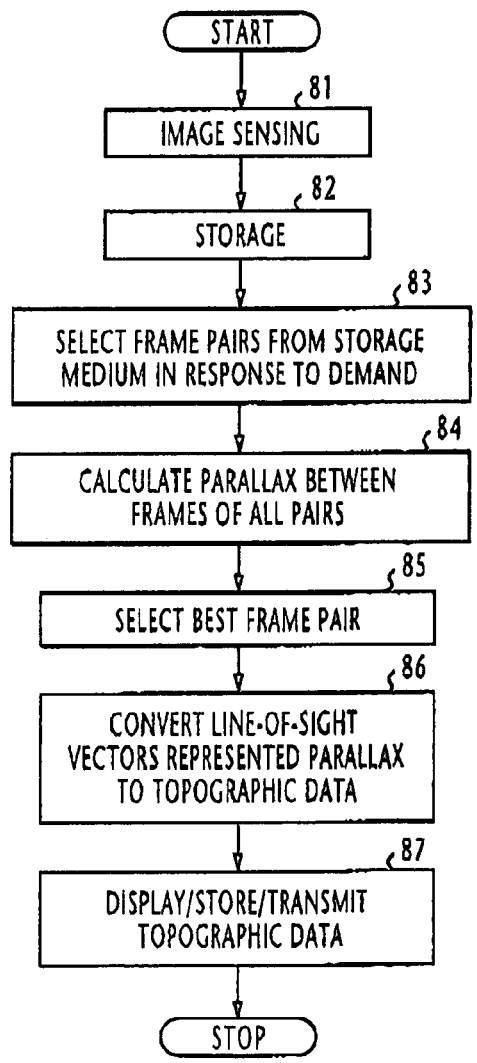
FIG. 8 is a flowchart useful for describing the operation of the first embodiment of the present invention.

FIG. 8 is a flowchart which summarizes the operation of the first embodiment of the present invention. At step 81, the satellites 11 and 12 are encircling the earth to capture photographic images of various regions of the earth on predetermined schedule. The captured images are scanned and transmitted to the earth station 14 and stored in storage medium 27 (step 82). In response to demand for creating topographic data, a plurality of frame pairs containing a target area are selected from the storage medium (step 83). Parallax is calculated between the frames of each selected pair (step 84). When parallax is calculated for all frame pairs, a best frame pair is selected (step 85). Line-of-sight vectors indicated by the parallax data of the best frame pair are used to produce topographic data (step 86) and utilized for display, storage or transmission (step 87).

In the first embodiment of this invention, topographic data is produced exclusively from the stored data in the storage medium 27. If appropriate frames are not available in the storage medium, no topographic data is obtained.

Figure 9:
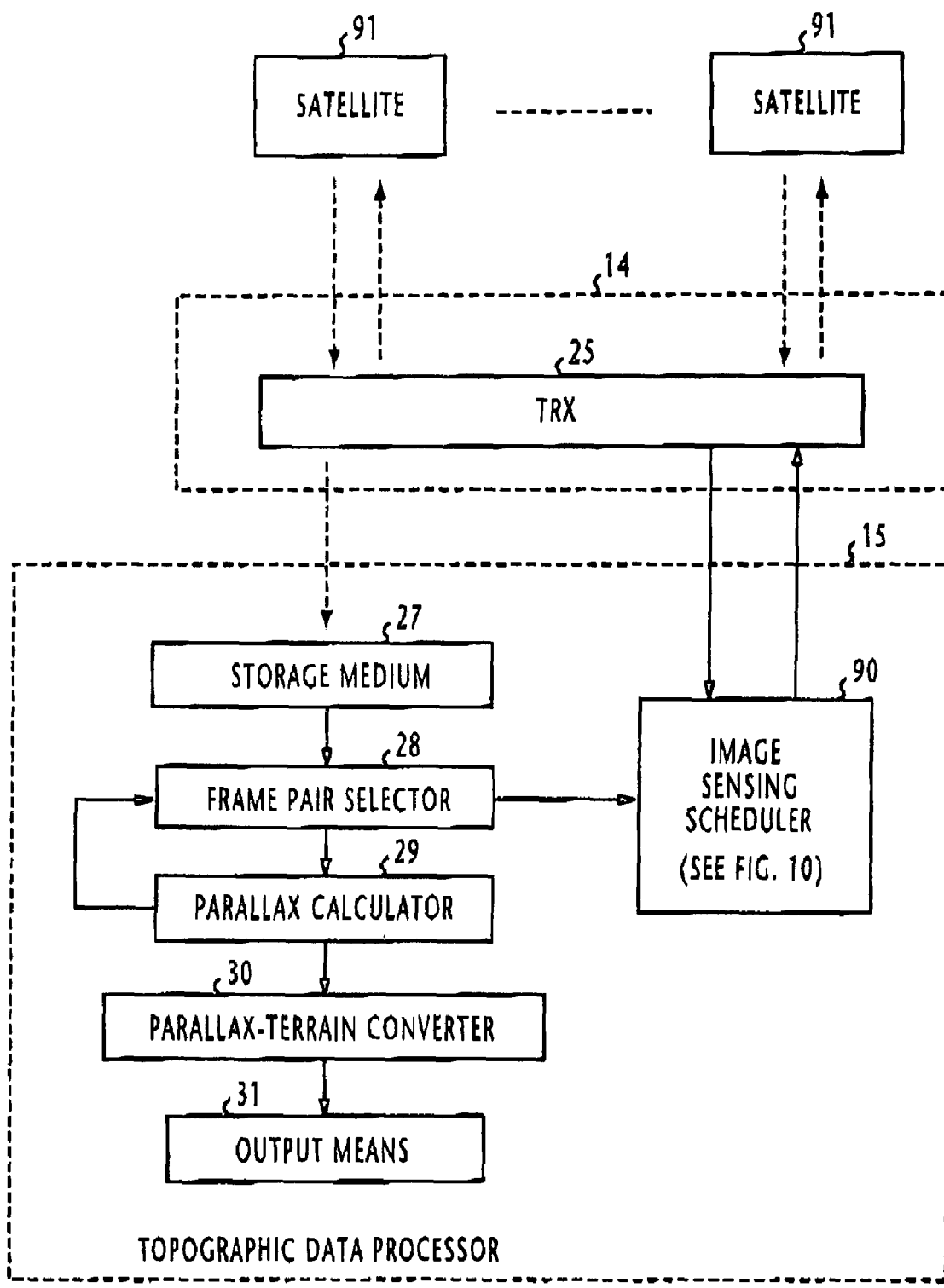
FIG. 9 is a block diagram of a topographic data processor of a second embodiment of the present invention.

A second embodiment of the present invention, shown in FIG. 9, is intended to solve this problem. In FIG. 9, parts corresponding to those in FIG. 2 are marked with the same numerals and the description thereof is omitted. In this embodiment, the system additionally includes an image sensing scheduler 90 which is connected to the frame pair selector 28 and to the RF transceiver 25. The decision module of frame pair selector 28 checks to see if there is no usable frame or if the parallax data of the best frame pair is not usable. In either case, the frame pair selector 28 instructs the image sensing scheduler 91 to proceed with the formulation of an image sensing schedule. According to the formulated schedule, the scheduler 90 sends a sensing command signal to one or more earth observation satellites 91 via the RF transceiver 25.

Figure 10:
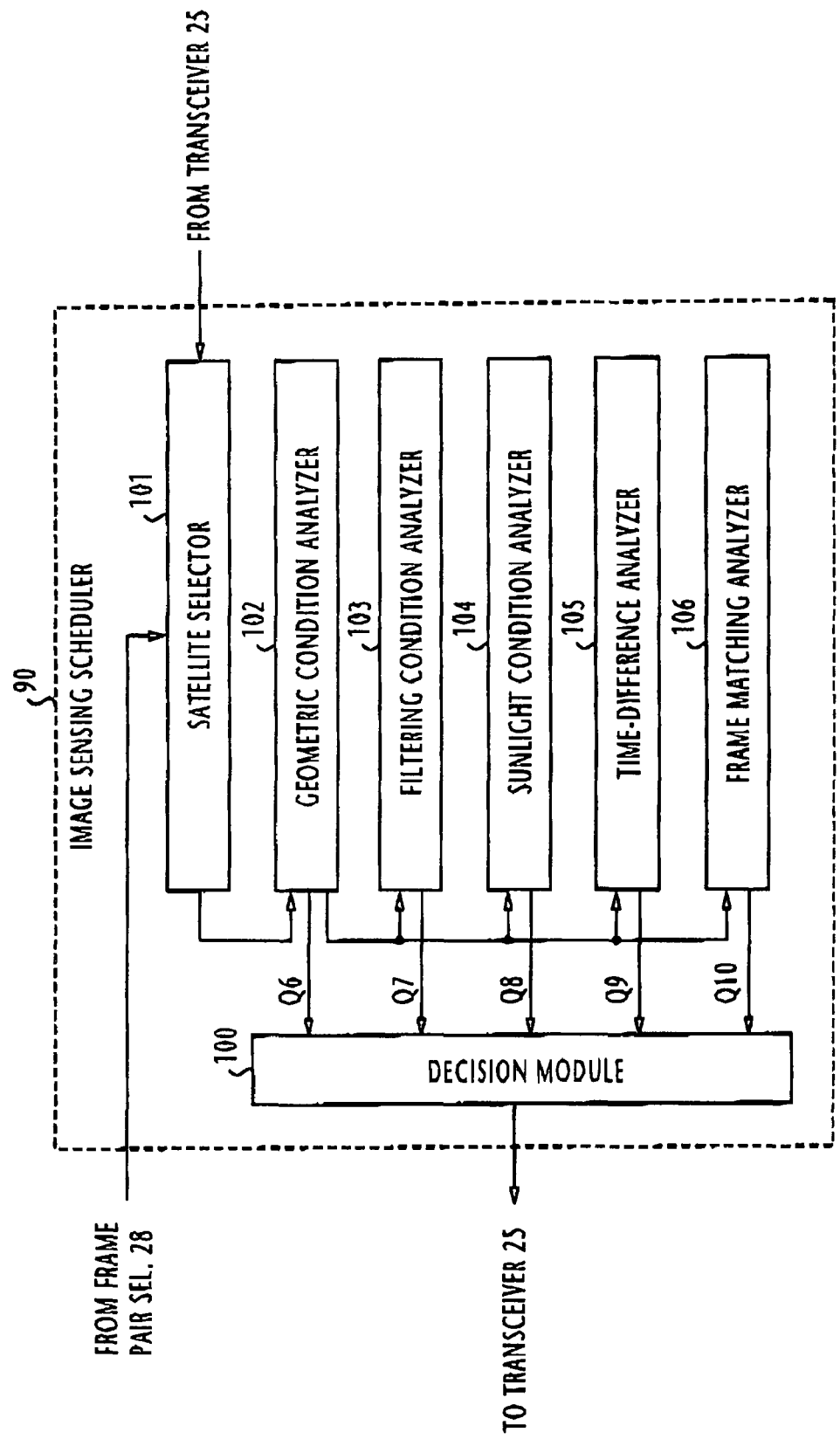
FIG. 10 is a block diagram of an image sensing scheduler of FIG. 9.

As shown in FIG. 10, the scheduler 90 includes a decision module 100, a satellite selector 101, a geometric condition analyzer 102, a filtering condition analyzer 103, a sunlight condition analyzer 104, a time-difference analyzer 105 and a frame matching analyzer 106.

Satellite selector 101 is responsive to the instruction from the frame pair selector 28 to select one or more earth observation satellites which cover the target area and send picture frames within a scheduled interval of time, which may be ten minutes or as long as several months. If a satellite is flying over the same area several times during a known time interval, the image sensor of the same satellite is treated as a separate sensor as long as the pictures are captured at different angles to the target area. According to the instruction from the frame pair selector 28, the satellite selector 101 receives picture frames of the selected satellites from the RF transceiver 25 and supplies the received frames to the modules 102, 103, 104 and analyzers 105, 106.

Geometric condition analyzer 102 combines the picture frames supplied from the satellite selector 101 into a plurality of pairs of frames that compose stereoscopic images and supplies the pairs of combined frames to the other analyzers 103 to 106. Analyzer 102 further informs the decision module 100 of the identifiers of the satellites from which the paired picture frames are obtained. As described previously with respect to the geometric condition analyzer 42, the geometric condition analyzer 102 calculates the quantum errors of the combined frames of each stereoscopic pair and assigns a fitness value Q6 to each frame pair so that a highest value Q6 is given to a frame pair of smallest quantum error.

Figure 11:
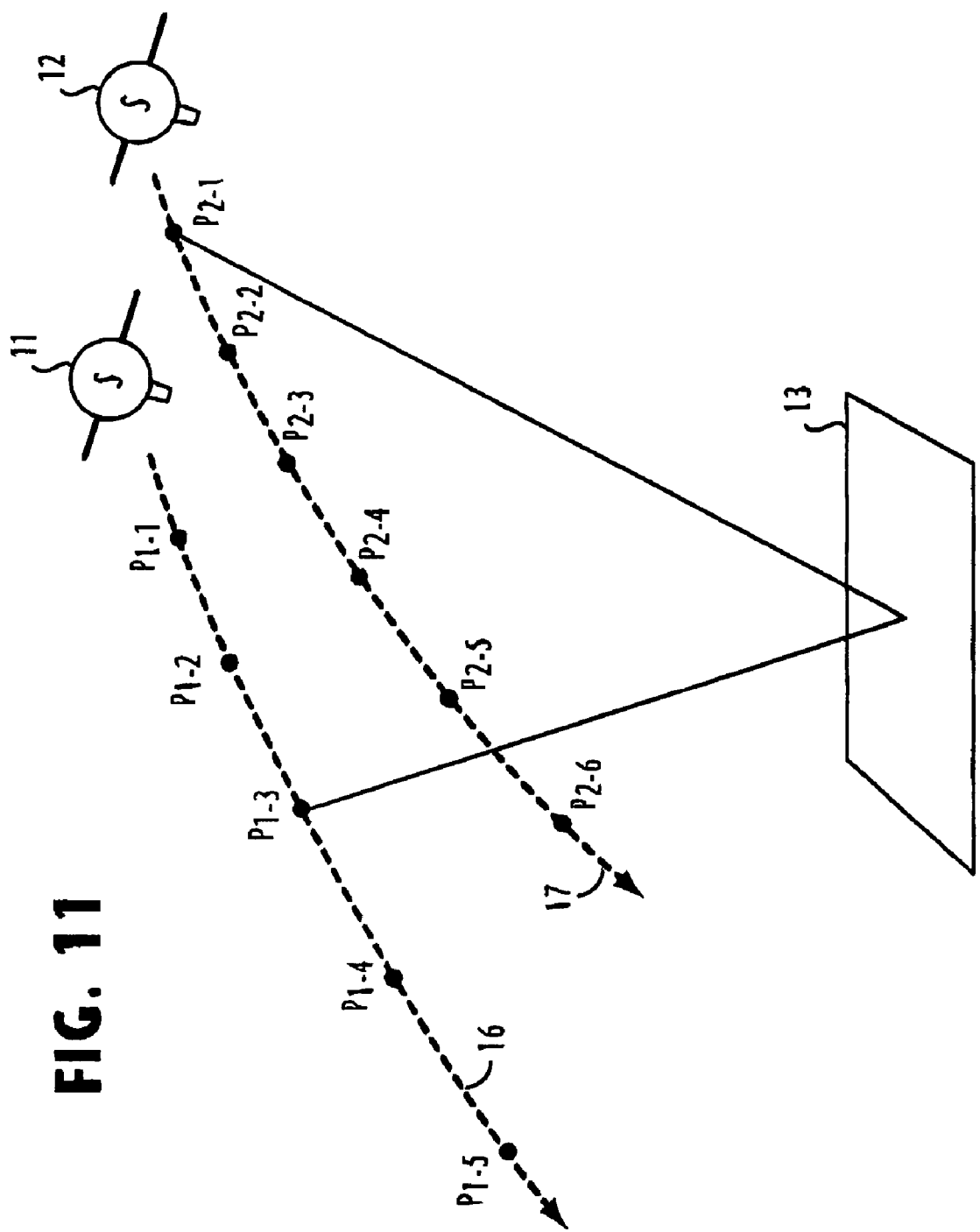
FIG. 11 is a schematic diagram useful for describing the operation of a geometric condition analyzer of FIG. 10.

The operation of the geometric condition analyzer 101 for detecting quantum errors between two picture frames will be described with reference to FIG. 11.

Assume that satellites 11 and 12 are selected by the satellite selector 101, respectively encircling the earth on orbits 16 and 17 that cover the target area 13. A first set of sensing points $p_{1-1} \sim p_{1-5}$ are established at intervals along the orbit 16, and a second set of sensing points $p_{2-1} \sim p_{2-6}$ are established at intervals along the orbit 17. Picture frames at the sensing points are then paired between the first and second sets, such as between point $p_{1-3}$ and point $p_{2-1}$, for example. For each pair of sensing points, a quantum error is then calculated between the frames at the sensing points and the pair of sensing points is evaluated with a fitness value Q6 as follows:

$$Q6 = q\_6/E_h + 1/E_v \qquad (13)$$

where q_6 is a positive weight value which is usually equal to unity. High Q6 value is assigned to a frame pair if the horizontal and vertical components of the quantum error are small.

If more than two satellites are selected, sensing points are established in the same manner as discussed above. If only one new picture frame is desired, using a stored frame as its companion, Equation (13) is calculated by assuming that there is only one fixed sensing point for one of the satellites.

Filtering condition analyzer 103, the sunlight condition analyzer 104, the time difference analyzer 105 and the frame matching analyzer 106 correspond respectively to the filtering condition analyzer 43, sunlight condition analyzer 44, time difference analyzer 45 and frame matching analyzer 45, and operate in like manner to that described previously to produce fitness values Q7, Q8, Q9 and Q10.

Decision module 100 makes a decision on the fitness values Q6~Q10 of each frame pair and produces a total of weighted fitness values (quality value) Q of the frame pair as follows:

$$Q = w_6 Q6 + w_7 Q7 + w_8 Q8 + w_9 Q9 + w_{10} Q10 \qquad (14)$$

where, $w_6 \sim w_{10}$ are weight values of the corresponding fitness values Q6 to Q10. If use is made of only the geometric condition analyzer 102, the weight value $w_6$ is set equal to 1 and all the other weight values are set to zero.

Based on the total fitness value Q, the decision module 100 formulates an image sensing schedule. The schedule includes data identifying satellites to be used, sensing positions, sensing times and filtering conditions. According to the schedule, the decision module 100 sends a command signal to one or more satellites through the transmitter 92.

FIG. 12 is a flowchart which summarizes the operation of the second embodiment of the present invention. At step 121, frame pair selection is performed to select a plurality of pairs of frames from the storage medium 27. At decision step 122, decision is made as to whether or not usable frames are available. If the selected frames are usable for producing topographic data, flow proceeds to step 123 to perform parallax calculation and select a best frame pair. At step 124, decision is made as to whether or not parallax data of the best frame pair is usable. If the decision is affirmative, flow proceeds to step 125 to perform parallax-terrain conversion to produce topographic data which is output to a display or the like (step 126).

If the decision at step 122 or 124 is negative, flow proceeds to step 127 to formulate an image sensing schedule and transmit a command signal to one or more satellites (step 128) and returns to step 121.

What is claimed is:

1. A topographic data processor comprising:
   means for selecting a pair of frames from a plurality of candidate picture frames of a target area captured from a plurality of orbits, each frame of the pair of frames having been independently captured on a unique orbit of the plurality of orbits, said pair of frames constituting a stereoscopic image of said target area;
   means for determining a parallax between the selected frames and producing therefrom a first plurality of line-of-sight vectors and a second plurality of line-of-sight vectors; and
   means for converting said first and second pluralities of line-of-sight vectors to topographic data.

2. A topographic data processor as claimed in claim 1, wherein said frame selecting means comprises:
   frame combining means for combining said candidate frames into a plurality of pairs of frames which constitute a stereoscopic image of said target area; and
   evaluating means for evaluating each of said pairs of frames with a fitness value indicative of fitness of said each pair of frames to topographic measurement of said target area.

3. A topographic data processor as claimed in claim 2, wherein said evaluating means comprises:
   a geometric condition analyzer for analyzing said pairs of frames in terms of their geometric condition and evaluating said pairs of frames with a fitness value proportional to their image resolution; and
   decision making means for making a decision on the fitness values obtained from all pairs of frames and selecting one of said pairs of frames having the highest fitness value.

4. A topographic data processor as claimed in claim 3, wherein said parallax determining means determines a parallax between the frames of each said pair of frames, and
wherein said evaluating means further comprises frame matching analyzing means for analyzing said pairs of frames in terms of degree of match between the paired frames and evaluating said pairs of frames with a fitness value proportional to an average value of point-to-point correlations between said paired frames,
wherein said decision making means produces a total value of the fitness values of each of said pairs of frames and selecting one of said pairs of frames having the highest total value.

5. A topographic data processor as claimed in claim 4, wherein said parallax determining means comprises:
frame aligning means for aligning the frames of said selected pair so that the frames are equally oriented; and
correlation calculating means for calculating point-to-point correlation values between the aligned frames and supplying the calculated correlation values to said frame matching analyzing means, and
wherein the frame matching analyzing means calculates said average value of point-to-point correlations from the correlation values supplied from the correlation calculating means.

6. A topographic data processor as claimed in claim 4, wherein said parallax determining means further comprises an interpolator for interpolating one of the paired frames before said frames are aligned in orientation so that said frames of said pair have equal value of resolution.

7. A topographic data processor as claimed in claim 2, wherein said parallax determining means comprises:
frame aligning means for aligning the frames of said selected pair in orientation; and
correlation calculating means for calculating point-to-point correlations between the aligned frames.

8. A topographic data processor as claimed in claim 2, wherein said evaluating means further comprises filtering condition analyzing means for analyzing each of said pairs of frames in terms of filtering condition and evaluating each said pair of frames with a fitness value representative of filtering characteristics of image sensors.

9. A topographic data processor as claimed in claim 2, wherein said evaluating means further comprises sunlight condition analyzing means for analyzing each of said pairs of combined frames in terms of sunlight condition and evaluating each said pair of frames with a fitness value representative of degree of similarity in shadow and shading effects between the frames of each said pair.

10. A topographic data processor as claimed in claim 2, wherein said evaluating means further comprises time difference analyzing means for analyzing each of said pairs of combined frames in terms of time difference and evaluating each said pair of frames with a fitness value inversely proportional to a time difference between the instant one of the frames of said each pair is captured and the instant the other frame is captured.

11. A topographic data processor as claimed in claim 1, further comprising storage medium for storing a plurality of picture frames captured by airborne image sensors, wherein said selecting means selects said pair of frames from said storage medium.

12. A topographic data processor as claimed in claim 10, wherein said frame combining means includes area selecting means for selecting picture frames covering said target area from all picture frames stored in said storage medium.

13. A topographic data processor as claimed in claim 1, further comprising an image sensing scheduler comprising:
image sensor selecting means for selecting at least one airborne image sensor if an appropriate frame is not available to constitute said stereoscopic image and sensing picture frames from the selected image sensor;
frame combining means for combining the sensed picture frames to form a plurality of pairs of received frames which may constitute a stereoscopic image of said target area; evaluating means for evaluating each pair of sensed frames with a fitness value indicative of fitness of said each pair of frames to topographic measurement of said target area; and
means for producing a schedule for selecting one or more airborne sen fitness values obtained from all pairs of sensed frames.

14. A topographic data processor as claimed in claim 13, wherein said evaluating means comprises a geometric condition analyzer for analyzing said pairs of sensed frames in terms of their geometric condition and evaluating said pairs of frames with a fitness value inversely proportional to quantum errors between the frames of each said pair.

15. A topographic data processor as claimed in claim 14, wherein said evaluating means comprises filtering condition analyzing means for analyzing each of said pairs of sensed frames in terms of filtering condition and evaluating each said pair of sensed frames with a fitness value representative of filtering characteristics of image sensors.

16. A topographic data processor as claimed in claim 14, wherein said evaluating means further comprises sunlight condition analyzing means for analyzing each of said pairs of sensed frames in terms of sunlight condition and evaluating each said pair of sensed frames with a fitness value representative of degree of similarity in shadow and shading effects between the frames of each said pair.

17. A topographic data processor as claimed in claim 14, wherein said evaluating means further comprises time difference analyzing means for analyzing each of said pairs of sensed frames in terms of time difference and evaluating each said pair of sensed frames with a fitness value inversely proportional to a time difference between the instant one of the frames of said each pair is captured and the instant the other frame is captured.

18. A computer readable storage medium containing a program executable by a computer to perform the steps of:
a) selecting a pair of frames from a plurality of candidate picture frames of a target area captured from a plurality of orbits, each frame of the pair of frames having been independently captured on a unique orbit of the plurality of orbits, said pair of frames constituting a stereoscopic image of said target area;
b) determining a parallax between the selected frames and producing therefrom a first plurality of line-of sight vectors and a second plurality of line-of sight vectors; and
c) converting said first and second pluralities of line-of siight vectors to topographic data.

19. A computer readable storage medium as claimed in claim 18, wherein step (a) comprises:
$a_1$) combining said candidate frames into a plurality of pairs of frames which constitute a stereoscopic image of said target area;
$a_2$) evaluating each of said pairs of frames with a fitness value indicative of fitness of said each pair of frames to topographic measurement of said target area; and
$a_3$) selecting one of said pairs of frames based on fitness values pairs of frames.

20. A computer readable storage medium as claimed in claim 19, wherein step ($a_2$) comprises:
- $a_{2-1}$) analyzing said pairs of frames in terms of their geometric condition and evaluating said pairs of frames with a fitness value proportional to their image resolution; and
- $a_{2-2}$) making a decision on the fitness values obtained by all pairs of frames and selecting one of said pairs of frames having the highest fitness value.

21. A computer readable storage medium as claimed in claim 20, wherein step ($a_2$) further comprises analyzing each of said pairs of frames in terms of filtering condition and evaluating each said pair of frames with a fitness value representative of filtering characteristics of image sensors.

22. A computer readable storage medium as claimed in claim 20, wherein step ($a_2$) further comprises analyzing each of said pairs of combined frames in terms of sunlight condition and evaluating each said pair of frames with a fitness value representative of degree of similarity in shadow and shading effects between the frames of each said pair.

23. A computer readable storage medium as claimed in claim 20, wherein step ($a_2$) further comprises analyzing each of said pairs of combined frames in terms of time difference and evaluating each said pair of frames with a fitness value inversely proportional to a time difference between the instant one of the frames of said each pair is captured and the instant the other frame is captured.

24. A computer readable storage medium as claimed in claim 19, wherein step (b) determines a parallax between the frames of each said pair of frames, and
wherein step ($a_2$) further comprises the step ($a_{2-3}$) of analyzing said pairs of frames in terms of degree of match between the paired frames and evaluating said pairs of frames with a fitness value proportional to an average value of point-to-point correlations between said paired frames,
wherein step ($a_{2-2}$) produces a total value of the fitness values of each of said pairs of frames and selecting one of said pairs of frames having the highest total value.

25. A computer readable storage medium as claimed in claim 24, wherein step (b) comprises:
- $b_1$) aligning the frames of said selected pair so that the frames are equally oriented; and
- $b_2$) calculating point-to-point correlation values between the aligned frames, and wherein step ($a_{2-3}$) calculates said average value of point-to-point correlations from the correlation values calculated by step ($b_2$).

26. A computer readable storage medium as claimed in claim 18, wherein step (b) comprises:
- $b_1$) aligning the frames of said selected pair in orientation; and
- $b_2$) calculating point-to-point correlations between the aligned frames.

27. A computer readable storage medium as claimed in claim 26, wherein step (b) further comprises interpolating one of the paired frames before step ($b_1$) is performed so that said frames of said pair have equal value of resolution.

28. A computer readable storage medium as claimed in claim 18, further comprising the steps of:
- c) selecting at least one airborne image sensor if an appropriate frame is not available to constitute said stereoscopic image and sensing picture frames from the selected image sensor;
- d) combining the received picture frames to form a plurality of pairs of sensed frames which may constitute a stereoscopic image of said target area;
- e) evaluating each pair of sensed frames with a fitness value indicative of fitness of said each pair of frames to topographic measurement of said target area; and
- f) producing a schedule for selecting one or more airborne sensors based on the fitness values obtained from all pairs of sensed frames.

29. A computer readable storage medium as claimed in claim 28, wherein step (e) comprises analyzing said pairs of sensed frames in terms of their geometric condition and evaluating said pairs of frames with a fitness value inversely proportional to quantum errors between the frames of each said pair.

30. A computer readable storage medium as claimed in claim 28, wherein step (e) further comprises analyzing each of said pairs of sensed frames in terms of filtering condition and evaluating each said pair of sensed frames with a fitness value representative of filtering characteristics of image sensors.

31. A computer readable storage medium as claimed in claim 28, wherein step (e) further comprises analyzing each of said pairs of sensed frames in terms of sunlight condition and evaluating each said pair of sensed frames with a fitness value representative of degree of similarity in shadow and shading effects between the frames of each said pair.

32. A computer readable storage medium as claimed in claim 28, wherein step (e) further comprises analyzing each of said pairs of sensed frames in terms of time difference and evaluating each said pair of sensed frames with a fitness value inversely proportional to a time difference between the instant one of the frames of said each pair is captured and the instant the other frame is captured.

33. A computer readable storage medium as claimed in claim 18, further comprising the steps of:
selecting at least one airborne image sensor if an appropriate frame is not available in said plurality of candidate frames, and sensing picture frames from the selected image sensor as said plurality of candidate picture frames, and repeating step (a) to select a new pair of frames from said sensed picture frames.

34. A computer readable storage medium as claimed in claim 33, wherein step (a) comprises:
- $a_1$) combining the received picture frames to form a plurality of pairs of sensed frames which may constitute a stereoscopic image of said target area; and
- $a_2$) evaluating each pair of sensed frames with a fitness value indicative of said each pair of frames to topographic measurement of said target area.

35. A computer readable storage medium as claimed in claim 34, wherein step ($a_2$) comprises analyzing said pairs of sensed frames in terms of their geometric condition and evaluating said pairs of frames with a fitness value inversely proportional to quantum errors between the frames of each said pair.

36. A computer readable storage medium as claimed in claim 35, wherein step ($a_2$) further comprises analyzing each of said pairs of sensed frames in terms of filtering condition and evaluating each said pair of sensed frames with a fitness value representative of filtering characteristics of image sensors.

37. A computer readable storage medium as claimed in claim 35, wherein step ($a_2$) further comprises analyzing each of said pairs of sensed frames in terms of sunlight condition and evaluating each said pair of sensed frames with a fitness value representative of degree of similarity in shadow and shading effects between the frames of each said pair.

38. A computer readable storage medium as claimed in claim 35, wherein step ($a_2$) further comprises analyzing each of said pairs of sensed frames in terms of time difference and evaluating each said pair of sensed frames with a fitness value inversely proportional to a time difference between the instant one of the frames of said each pair is captured and the instant the other frame is captured.

39. A computer readable storage medium as claimed in claim 35, wherein step ($a_2$) further comprises analyzing each of said pairs of frames in terms of degree of match between the frames of each pair and evaluating each said pair of frames with a fitness value proportional to an average value of point-to-point correlations between said paired frames.

* * * * *

UNITED STATES PATENT AND TRADEMARK OFFICE
CERTIFICATE OF CORRECTION

PATENT NO. : 7,283,658 B2  Page 1 of 1
APPLICATION NO. : 10/600087
DATED : October 16, 2007
INVENTOR(S) : Makoto Maruya It is certified that error appears in the above-identified patent and that said Letters Patent is hereby corrected as shown below:

On the title page; item [73] should read:

(73) Assignee: NEC Toshiba Space Systems, Ltd. (JP)

Signed and Sealed this

Third Day of June, 2008

JON W. DUDAS
*Director of the United States Patent and Trademark Office*